June 29, 1926.
G. J. ZEIS
1,590,341
ORNAMENTAL AMUSEMENT DEVICE
Filed August 1, 1925
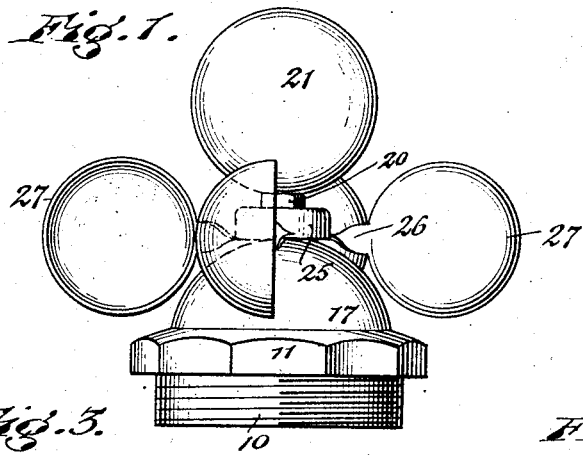
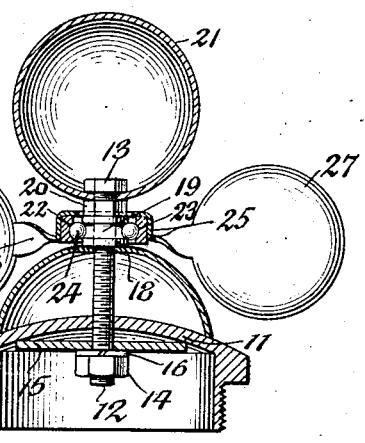
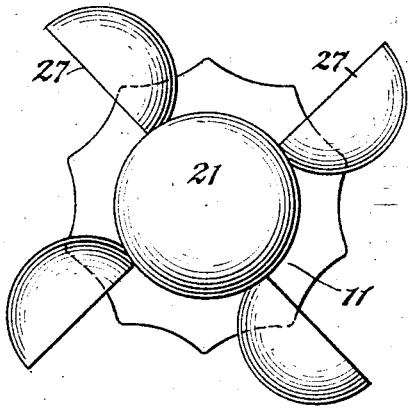
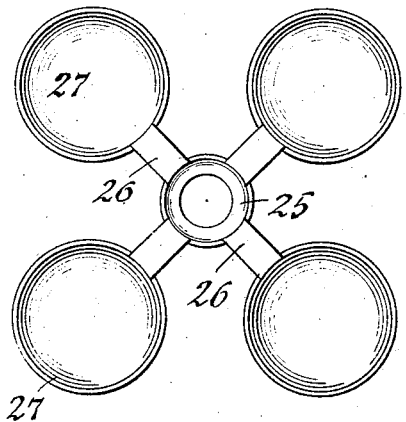
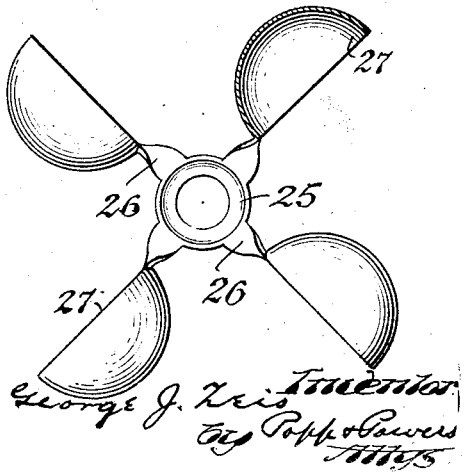

Patented June 29, 1926.

1,590,341

UNITED STATES PATENT OFFICE.

GEORGE J. ZEIS, OF BUFFALO, NEW YORK.

ORNAMENTAL AMUSEMENT DEVICE.

Application filed August 1, 1925. Serial No. 47,462.

This invention relates to an ornamental amusement device which is more particularly designed for use on the radiator caps and fenders of automobiles although the same may also be used elsewhere. Its object is to attract attention and entertain and it consists generally of a rotor pivotally mounted on a support and adapted to be turned by the wind.

In the accompanying drawings:—

Figure 1 is a side elevation of the ornamental amusement device embodying my invention and mounted on a radiator cap.

Figure 2 is a top plan view of the same.

Figure 3 is a vertical section thereof.

Figure 4 is a plan view of the partially completed rotor.

Figure 5 is a similar view of the rotor complete.

The radiator cap, which is one form of support for this ornamental amusement device, may be of any usual and well known construction that shown, for example, consisting of a cylindrical body 10 adapted to be connected by a screw joint with the filling collar of a radiator, and a top or dome 11 which closes the upper end of the body and which in this instance is dished upwardly.

Extending upwardly through the central part of the top 11 is an upright post 12 which is externally screw threaded and provided at its upper end with a head 13 and at its lower end with a screw nut 14. A clamping disk 15 engages with the underside of the cap and between this disk and the nut 14 a washer 16 is arranged on the post 12. Surrounding the central part of the post and resting on the cap is a hollow semi-spherical base 17. Resting on top of this base and surrounding the post is a bearing collar 18 which is provided on its periphery with an annular ball race or groove 19. A clamping screw nut 20 on the post engages with the upper side of the bearing collar. The numeral 21 represents a hollow ball which has an opening in its lower part for the reception of the post and which bears with its outer side against the top of the screw nut 20 while its inner side is engaged by the head 13 of the post. Surrounding the bearing collar is a bearing ring 22 which is provided in its bore with an annular ball race or groove 23. Between the bearing collar and ring and engaging with the grooves thereof is an annular row of bearing balls 24 which form an anti-friction bearing for the rotor and permit of turning the same easily and rapidly by the wind.

In its preferred form this rotor is constructed of a single sheet of metal, the blank of which is cut and stamped to form an upwardly dished hub 25, a plurality of radial arms 26 projecting outwardly from the lower edge of the hub, and a plurality of cup shaped paddles or wings 27, one arranged at the outer end of each arm and having a convex front side and a concave rear side. The metal of the arms in the partly completed blank are flat and the axis of each paddle is parallel with the axis of the hub, as shown in Figure 4. In the completed rotor, as shown in Figure 5, each arm is twisted a quarter turn so that its inner part is horizontal and its outer part is vertical and the axis of each paddle is arranged at right angles to the axis of the hub. The bearing ring is secured in the hub of the rotor by a driving fit, or in any other suitable manner, so that the same turn in unison on the radiator cap through the medium of the ball bearing interposed between the same.

This ornament is very attractive and interesting owing to the whirling action of the rotor when turned by the wind. It is also very simple, inexpensive and not likely to get out of order.

I claim as my invention:—

1. An amusement device having a hub, a plurality of arms radiating from said hub, and cups arranged at the outer ends of said arms, said hub-arms and cups being constructed from a single sheet of metal, each of said arms being twisted, and each of said cups having its front edge arranged in a plane, parallel with the axis of said hub.

2. An ornamental amusement device comprising a rotor adapted to be pivotally mounted on a support and including a dished hub, arms projecting outwardly from the lower edge of said hub and twisted so that the inner end of each arm is arranged horizontally and the outer end thereof is arranged vertically, and a cup shaped paddle arranged at the outer end of each arm and having a convex front side and a concave rear side, said hub, arms and paddles being constructed from a single sheet of metal.

3. An ornamental amusement device comprising a rotor including a dished hub, arms projecting outwardly from the lower edge of said hub and twisted so that the inner end of each arm is arranged horizontally and the outer end thereof is arranged vertically, and a cup shaped paddle arranged at the outer end of each arm and having a convex front side and a concave rear side, said hub, arms and paddles being constructed from a single sheet of metal, an outer bearing ring arranged within the hub and provided on its bore with an annular ball race, a post adapted to be mounted on a support, a bearing collar arranged on said post and provided on its periphery with an annular ball race, and an annular row of bearing balls arranged between said ball races.

4. An ornamental amusement device comprising a rotor including a dished hub, arms projecting outwardly from the lower edge of said hub and twisted so that the inner end of each arm is arranged horizontally and the outer end thereof is arranged vertically, and a cup shaped paddle arranged at the outer end of each arm and having a convex front side and a concave rear side, said hub, arms and paddles being constructed from a single sheet of metal, an upright post externally threaded and adapted to pass through the top of a support and said hub, a bearing ring arranged within said hub, a bearing collar mounted on said post, rolling bearing members interposed between said bearing ring and collar, and clamping means arranged on said post and engaging the upper side of said bearing collar and the underside of said support.

5. An ornamental amusement device comprising a rotor including a dished hub, arms projecting outwardly from the lower edge of said hub and twisted so that the inner end of each arm is arranged horizontally and the outer end thereof is arranged vertically, and a cup shaped paddle arranged at the outer end of each arm and having a convex front side and a concave rear side, said hub, arms and paddles being constructed from a single sheet of metal, an upright post externally threaded and adapted to pass through said hub and a support, a bearing ring arranged within said hub, a bearing collar mounted on said post, rolling bearing members interposed between said bearing ring and collar, clamping means arranged on said post and engaging the upper side of said bearing collar and the underside of said support, and a hollow ball mounted on the upper end of said post.

6. An ornamental amusement device comprising a rotor including a dished hub, arms projecting outwardly from the lower edge of said hub and twisted so that the inner end of each arm is arranged horizontally and the outer end thereof is arranged vertically, and a cup shaped paddle arranged at the outer end of each arm and having a convex front side and a concave rear side, said hub, arms and paddles being constructed from a single sheet of metal, an upright post externally threaded and adapted to pass through said hub and a support, a bearing ring arranged within said hub, a bearing collar mounted on said post, rolling bearing members interposed between said bearing ring and collar, clamping means arranged on said post and engaging the upper side of said dished hub and the underside of said support, a hollow ball mounted on said post and bearing with its underside against the top of the clamping means engaging the upper side of said dished hub, and a head arranged on said post and engaging with the inner side of said ball.

In testimony whereof I affix my signature.

GEORGE J. ZEIS.